United States Patent
Maiocchi et al.

(10) Patent No.: US 8,044,619 B2
(45) Date of Patent: Oct. 25, 2011

(54) PREVENTION OF CONCURRENT PWM OR PSM COMMUTATIONS OF POWER SIGNALS DRIVING A VOICE COIL MOTOR (VCM) TO REDUCE S/N RATIO DEGRADATION OF LOW LEVEL SIGNAL LINES OF A R/W HEAD

(75) Inventors: Giuseppe Maiocchi, Capiago Intimiano (IT); Ezio Galbiati, Agnadello (IT); Michele Boscolo Berto, Chioggia (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 1173 days.

(21) Appl. No.: 11/760,185

(22) Filed: Jun. 8, 2007

(65) Prior Publication Data

US 2007/0296362 A1     Dec. 27, 2007

(30) Foreign Application Priority Data

Jun. 9, 2006  (EP) .................................... 06425391

(51) Int. Cl.
*H02K 5/00*     (2006.01)
(52) U.S. Cl. ......... 318/400.13; 318/400.14; 318/400.19; 318/400.2

(58) Field of Classification Search ............. 318/400.13, 318/400.14, 400.19, 400.2
See application file for complete search history.

(56) References Cited

U.S. PATENT DOCUMENTS

| | | | |
|---|---|---|---|
| 4,523,134 A | 6/1985 | Kinoshita et al. | 318/313 |
| 5,450,252 A | 9/1995 | Kanda | 360/55 |
| 6,995,537 B1 | 2/2006 | Plutowski et al. | 318/590 |
| 2001/0054874 A1 | 12/2001 | Oku | 318/599 |

FOREIGN PATENT DOCUMENTS

| | | |
|---|---|---|
| EP | 0660495 | 6/1995 |
| EP | 0760552 | 3/1997 |
| EP | 1137162 | 9/2001 |

*Primary Examiner* — Bentsu Ro
*Assistant Examiner* — Erick Glass
(74) *Attorney, Agent, or Firm* — Lisa K. Jorgenson; Allen, Dyer, Doppelt, Milbrath & Gilchrist, P.A.

(57) ABSTRACT

A method of preventing concurrent or quasi-concurrent commutations of a pair of phase shift modulation (PSM) drive signals of an output bridge stage driving an electrical load includes establishing a threshold level of a programmed current level to be transmitted though the electrical load. The method also includes, if the programmed current level is lower than the threshold level, enhancing a time offset between commutation edges of the pair of PSM drive signals by a minimum time.

12 Claims, 6 Drawing Sheets

PREVENTION OF CONCURRENT PWM OR PSM COMMUTATIONS OF POWER SIGNALS DRIVING A VOICE COIL MOTOR (VCM) TO REDUCE S/N RATIO DEGRADATION OF LOW LEVEL SIGNAL LINES OF A R/W HEAD

FIELD OF THE INVENTION

This invention relates generally to disk storage devices with read/write (R/W) heads carried on an arm moved by a voice coil motor (VCM) and driven by phase shift modulation control circuitry of the VCM. In particular, a method is provided for avoiding concurrence of phase shift modulation commutations, and for avoiding summed switching energy sufficient to inject switching noise from the VCM power lines into adjacent low level signals lines of the moving arm.

BACKGROUND OF THE INVENTION

In operation, a disk drive controller generates a command to move the head to a certain location, and the command is translated into drive voltage signals applied to the winding of a VCM mounted at one extremity of the movable arm. These drive signals may be linear or switched mode signals. Switched mode drivers may implement different techniques such as, for example, pulse width modulation (PWM), phase shift modulation (PSM) and others, Generally, switched mode drivers may have the advantage of reducing power dissipation in the output transistors that comprise a common output bridge stage to which the motor coil is connected, and thus allow smaller devices and packaging, as compared to linear mode drivers.

The drive signals that are applied to the VCM functioning in a PSM mode are illustrated in FIG. 1. The PSM output power signals OUT1 and OUT2 are driven to a high logic level Vcc (where Vcc is power supply voltage), when PSM input signals are at high digital level, and to a low logic level equal to the ground voltage, when PSM input signals are at low digital level. In a PSM driver, a null output current may be obtained by driving both OUT1 and OUT2 with a 50% duty cycle. The ripple on the output current, Iload, is also shown. The functioning of a PSM driver and its advantages are disclosed in U.S. Pat. No. 5,917,720 to Galbiati.

The main advantage of PSM driver technique may be its outstanding linearity of control under any condition. In fact, as will be appreciated by the person of ordinary skill in the art, the PSM technique may not suffer, like the PWM technique, of the "$T_{on}$ minimum" problem. The "$T_{on}$ minimum" problem may not allow good control of the output voltage below a certain value of the duty cycle. Moreover, when PSM drives an inductive load like a VCM, the load current ripple decreases as the load current decreases toward zero, and this may be a benefit when there is need to implement very precise control under relatively low output current levels, as is typically the case in disk drives.

FIG. 2 illustrates a photographic reproduction of a typical disk drive mechanical arrangement. FIG. 2 also illustrates the VCM moving the R/W head carrying arm and the flexible flat cable connection (Flex Cable) carrying the power signal lines (PSM OUT1 and PSM OUT2!) as well as the low level signal lines (R/W head signals), running parallel in the flat cable. However, certain characteristics of the PSM driver for applications, such as, the one illustrated in FIG. 2 and alike, may be found to degrade the signal-to-noise ratio (S/N). These characteristics may manifest especially during precise controlling of the position of the R/W head over the rotating disc, a phase during which the resulting output current that is applied to the PSM driven coil of the VCM is relatively low level.

In fact, when controlling the VCM at relatively low current levels, both PSM drive signals may approach the 50% duty cycle, and, therefore, the PSM commutations may become so close to each other that they may practically be considered concurrent. In these conditions of operation, switching energies may sum and reach a level that may be sufficient to inject switching noise from the VCM power lines into adjacent low level signals lines of the flexible flat cable of electrical connection of the moving arm.

FIGS. 3 and 4 illustrate simulation waveforms when the commutations of the two PSM drive signals are not concurrent and concurrent, respectively. As may be observed in the latter case, the noise due to the two commutations concentrates in a narrowing time zone, and the resulting energy level may increase to a point sufficient to inject noise into adjacent low level signals lines of the flexible cable, corrupting data being transferred through the R/W channel.

SUMMARY OF THE INVENTION

The object of the present invention is to provide an approach to the above discussed problems of a PSM driver of a VCM of an arm carrying a transducer that uses precise positioning actuated by the VCM.

This approach may prevent or reduce the degradation of the S/N of low level signal lines of data transfer from and to the transducer caused by the injection of switching noise from nearby power signal lines applying PSM drive signals to the motor coil. This may be accomplished by enhancing the time offset between commutation edges of the two PSM drive signals either by phase shifting one of the signals from the other signal by a programmed amount sufficient to prevent any concurrent or quasi-concurrent commutation of both signals, or by broadening the width of the pulses of one PSM drive signal and narrowing the width of the pulses of the other PSM drive signal while maintaining constant the duty-cycle of each of the two drive signals.

These programmed modifying interventions on the PSM drive signals may be disabled when a command or input data, for programming the output current level to be applied to the PSM driven motor coil, surpasses a certain threshold level or the duty cycle of the single PSM drive signals surpasses a certain threshold value in approaching the 50% value that corresponds to the condition of practical null output current delivered to the motor coil. In doing so, the attendant increase of the ripple on the output current may be eliminated when the driving conditions are, such as, to shift naturally apart the edges of the pulses of the pair of PSM drive signals, i.e. when the motor coil is driven at relatively high current levels.

The phase shifting of one PSM drive signal from the other by a pre-established amount can be implemented by at least delaying one of the would-be-complementary triangular reference waveforms, with which the incoming control data is normally compared, over a certain number of bits that depends on the frequency of the system clock to generate the two PSM drive signals. If the alternative approach of broadening and narrowing the pulses of the two PSM drive signals is implemented, the duty-cycle of the single drive signals may be maintained at a constant level by coordinately modifying the two PSM drive signals, which in practice is done by subtracting an equivalent area to each broadened pulse of one of the two PSM drive signals and adding between the nar-

3 rowed pulses of the other PSM drive signal a short "make-up" pulse of area equivalent to the area subtracted to the narrowed pulse.

DETAILED DESCRIPTION OF THE PREFERRED EMBODIMENT

Figure 1:
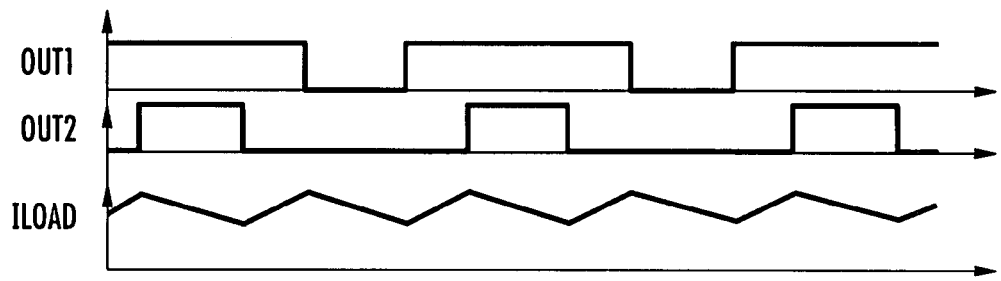
FIG. 1 illustrates the PSM drive signals and resulting current according to the prior art.
Figure 2:
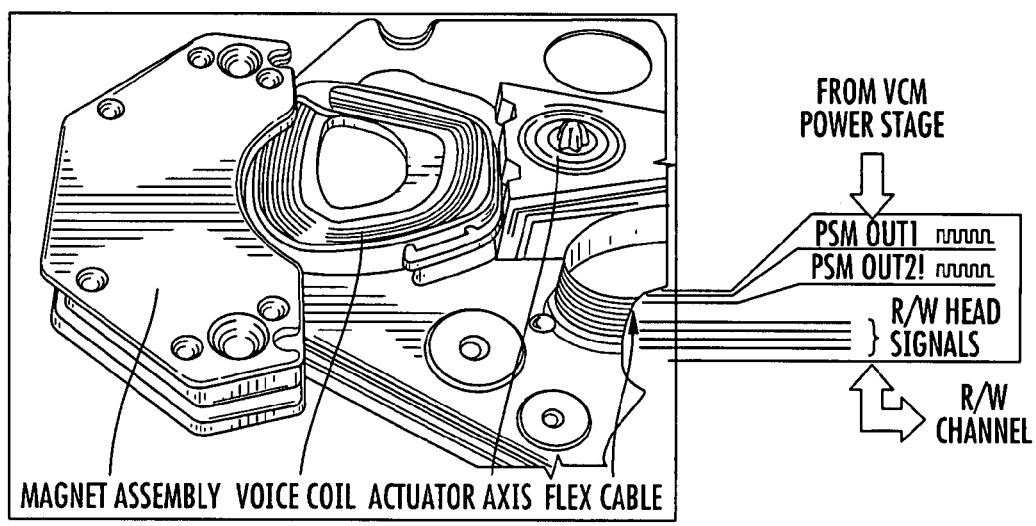
FIG. 2 is a photographic reproduction of a HD drive mechanical arrangement according to the prior art.
Figure 3:
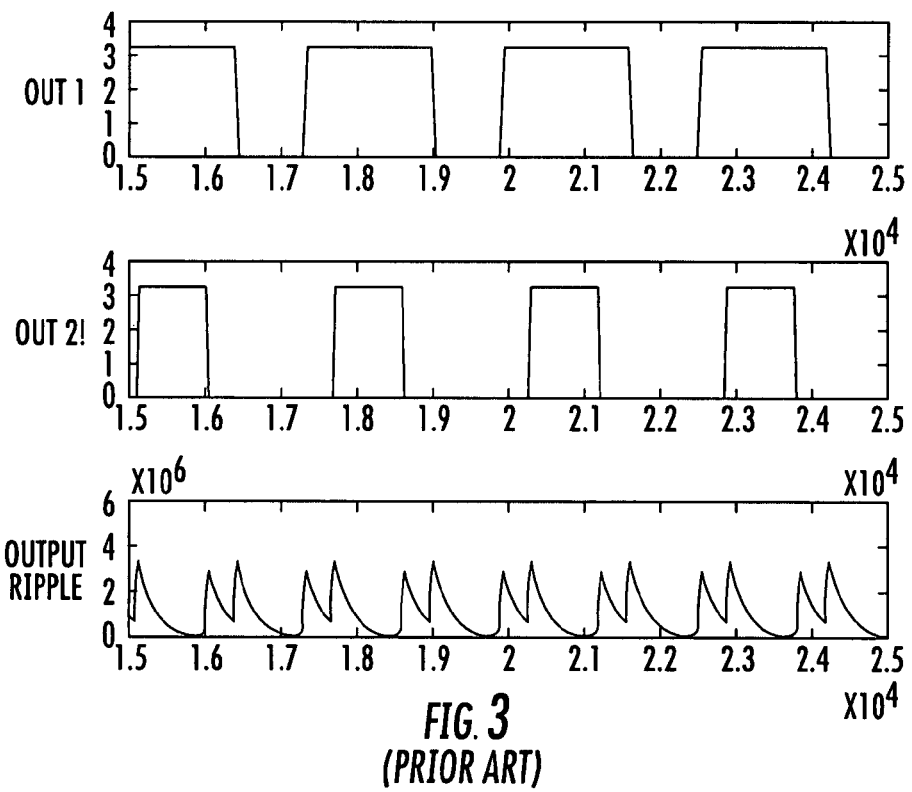
FIG. 3 illustrates the noise injected into a R/W signal line by substantially non-concurrent PSM commutations according to the prior art.
Figure 4:
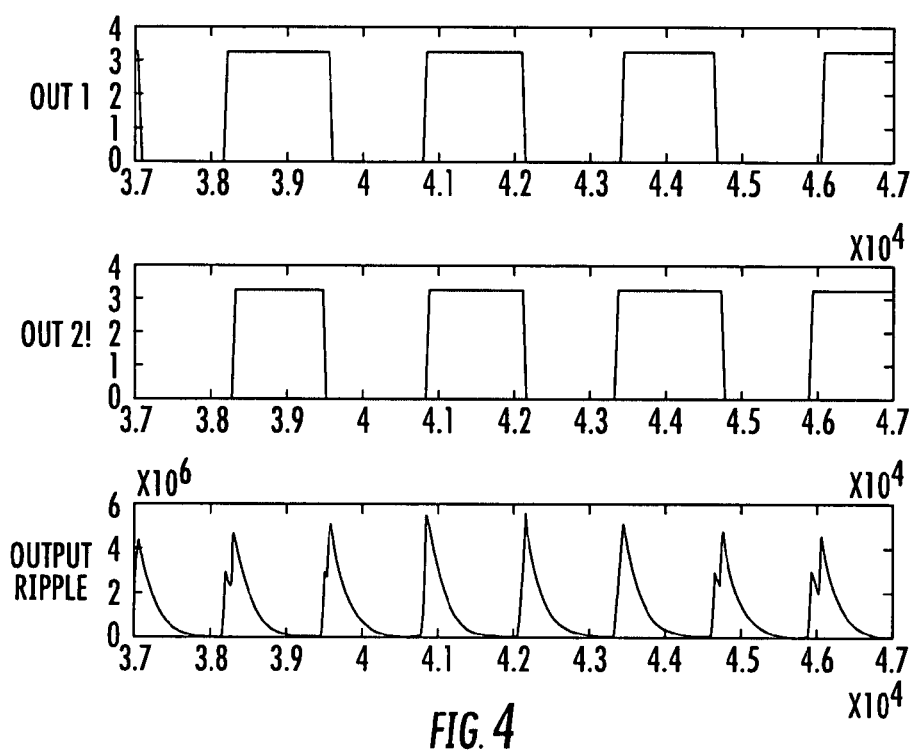
FIG. 4 illustrates the noise injected into R/W signals by substantially concurrent PSM commutations according to the prior art.
Figure 5:
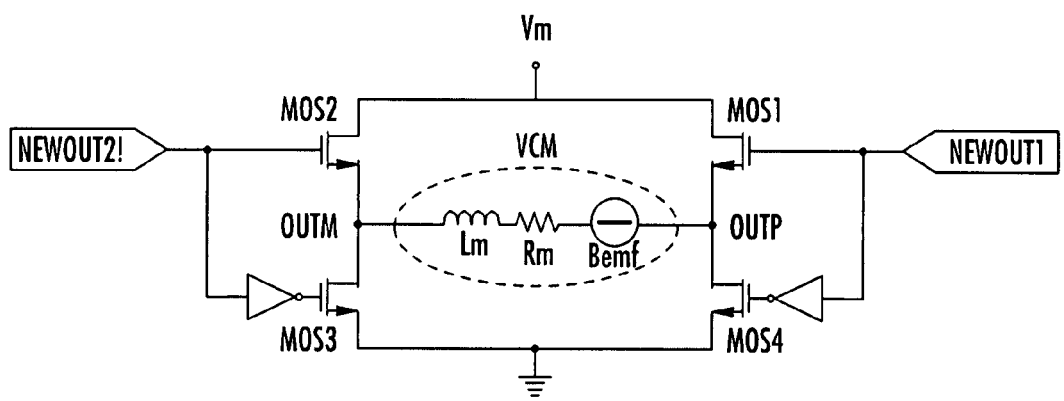
FIG. 5 illustrates a basic circuit diagram of PSM driving of a VCM through a full bridge output stage, according to the present invention.

FIG. 5 illustrates a basic circuit diagram of PSM driving of a VCM through a full bridge output stage comprising four MOSFET transistors MOS1, MOS2, MOS3, MOS4, connected between the supply node Vm and ground, and controlled by the pair of PSM drive signals NEWOUT1 and NEWOUT2!. According to an embodiment, the manner in which the edges of the pulses of the two PSM drive signals are modified in order to prevent concurrent commutations of the two PSM drive signals NEWOUT1 and NEWOUT2! is graphically illustrated in FIG. 6.

Figure 7:
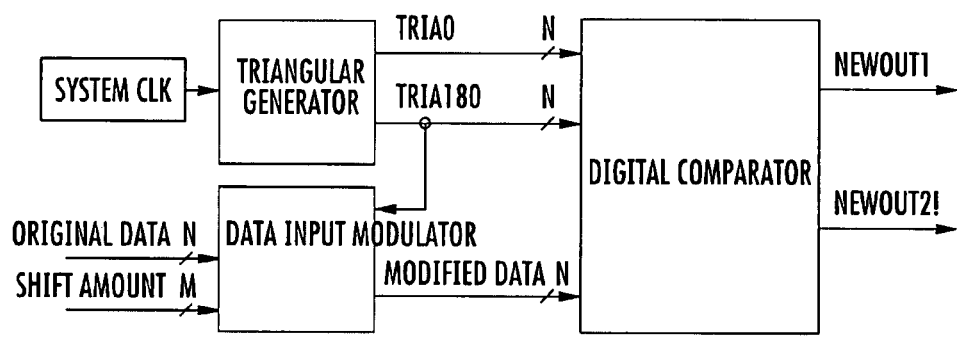
FIG. 7 is a high-level circuit diagram for generating the modified PSM drive signals, according to the present invention.

Generally, the original command or input data is represented by a certain value or level ORIGINAL DATA that is fed through the digital n-bit input to the DATA INPUT MODULATION block of the circuit diagram of FIG. 7 over a certain number of cycles that depends from the frequency of the system clock CLK, used for generating the pair of PSM drive signal by comparing the input value with two triangular reference signals synchronous with the system CLK and commonly in phase opposition to each other, namely TRIA_0 and TRIA_180.

Figure 6:
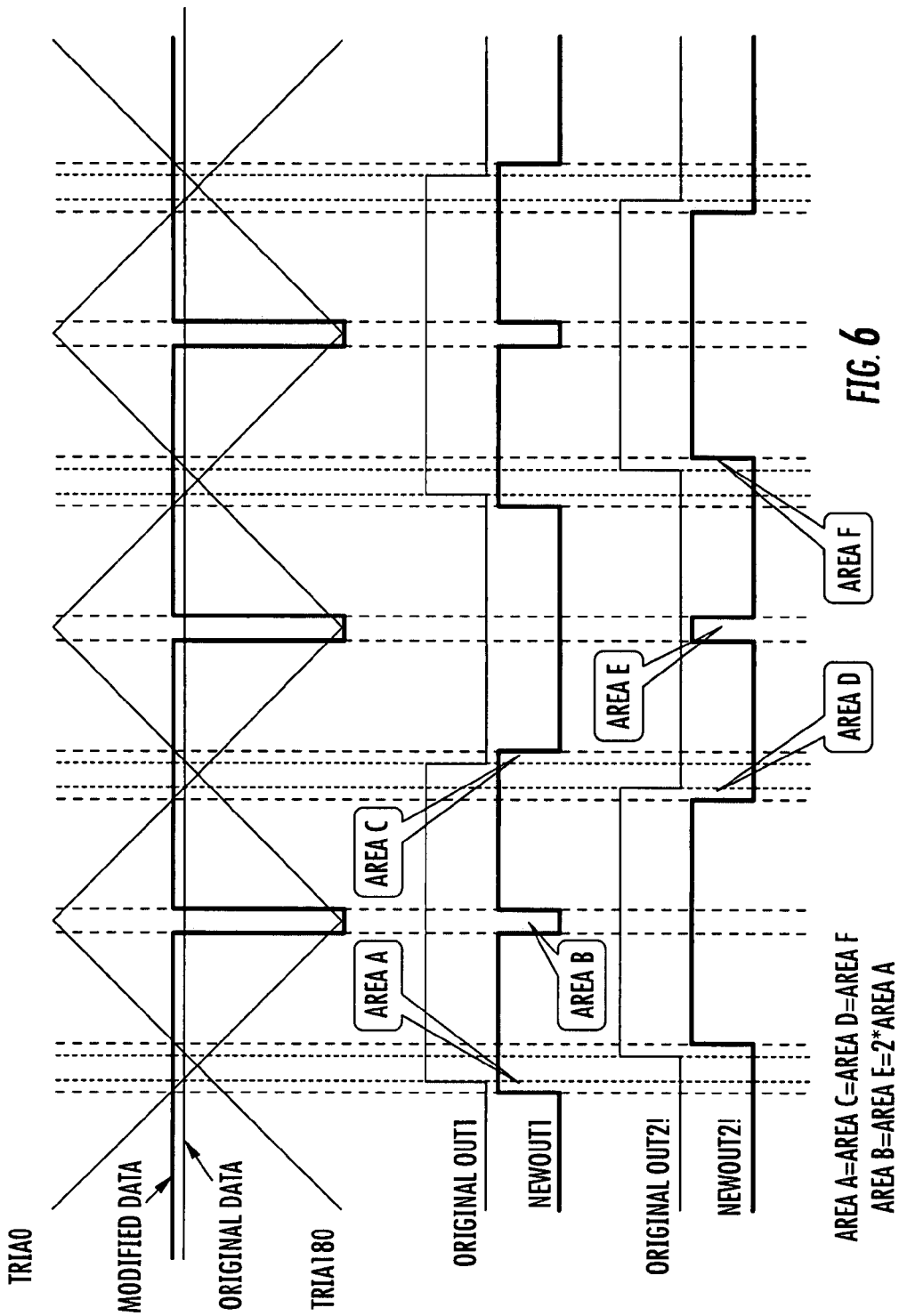
FIG. 6 illustrates the manner in which the edges of the pulses of the two PSM drive signals are modified in order to prevent concurrent commutations of the two PSM drive signals, according to the present invention.

As illustrated in FIG. 6, which relates to the case of an output current of positive sign being forced through the motor coil, the command ORIGINAL DATA is modified. In the sample illustration, the original data is modulated at the input to produce a modified input signal MODIFIED DATA of constant energy content i.e. same area under the waveform of the now periodic signal. Therefore, the pair of PSM drive signals may be generated by comparing the input signal that according to this embodiment is the modified input signal MODIFIED DATA, with two triangular reference signals in phase opposition with each other, namely TRIA_0 and TRIA_180.

The resulting PSM drive signals that are generated, namely NEWOUT1 and NEWOUT2!, are graphically compared in FIG. 6 with the corresponding PSM drive signals pair original OUT1 and original OUT2! that would have been generated by leaving unmodified the original input data. As emphasized by the shaded areas, the PSM drive signal NEWOUT1 has its pulses broadened, thus adding areas A and areas C in correspondence of the trailing and leading edges of the pulse. However, the area under the pulse profile is kept unchanged by subtracting the area B to the subtended area of the pulse, thus keeping unchanged the duty cycle of the periodic signal.

On the contrary, the pulses of the other PSM drive signal NEWOUT2! are narrowed by subtraction of areas of D and F in correspondence to their leading and trailing edges. The duty-cycle of the periodic signal, that is the area under the positive pulses, is maintained constant by the addition of a make-up or supplementary positive pulse of area E between each narrowed pulse of the PSM drive signal.

FIG. 7 illustrates a high-level circuit diagram for generating the above described modified PSM drive signals NEWOUT1 and NEWOUT2! by commanding a certain shift amount, through the digital m-bit input to the Data Input Modulation block, of the edges of the pulses of the PSM signals according to the modification scheme illustrated in FIG. 6. A person of ordinary skill in the art will readily be able to practice this embodiment by defining appropriate circuitry details of his or her choice of the input data modulator block of FIG. 7, such as to accomplish the illustrated (FIG. 6) modification of the original data.

The amount of edge shift that is introduced according to this embodiment, and consequently, the subtended area to be added or eliminated in the respective modified PSM drive signals NEWOUT1 and NEWOUT2!, may be predetermined such to ensure that the sum of PSM commutations energies as they get closer and closer may remain safely below a critical level that would generate an unacceptable S/N in low signal data upon injection via flexible cable parasitic capacitances into low level signal data lines, would generate an unacceptable S/N noise in low signal data. On the other hand, the amount of edge shift should not be to excessive in order to limit the attendant increase of the ripple on the output delivered to the motor coil, thereby keeping it an acceptable range.

Figure 8:
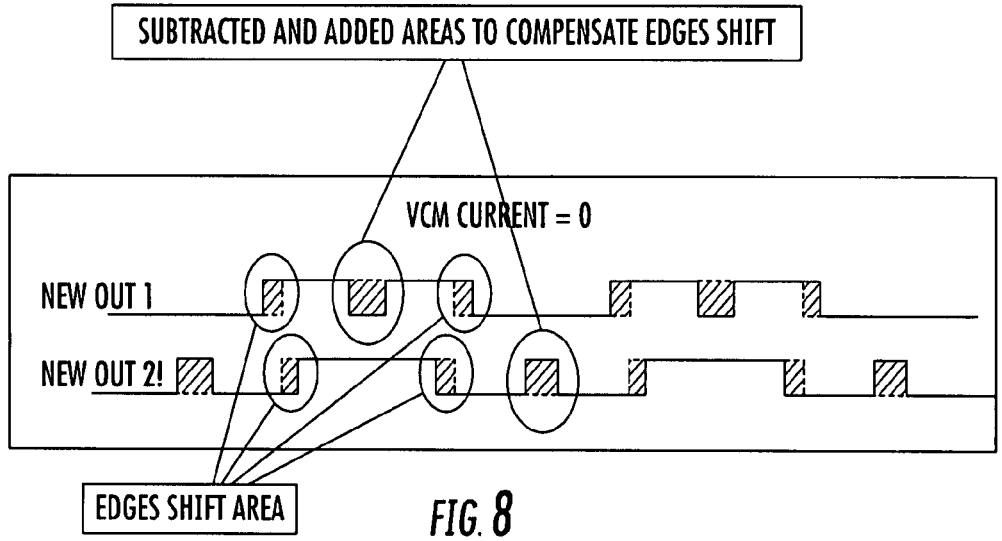
FIGS. 8, 9, and 10 clarify certain characteristics of the technique used according to the present invention.
Figure 9:
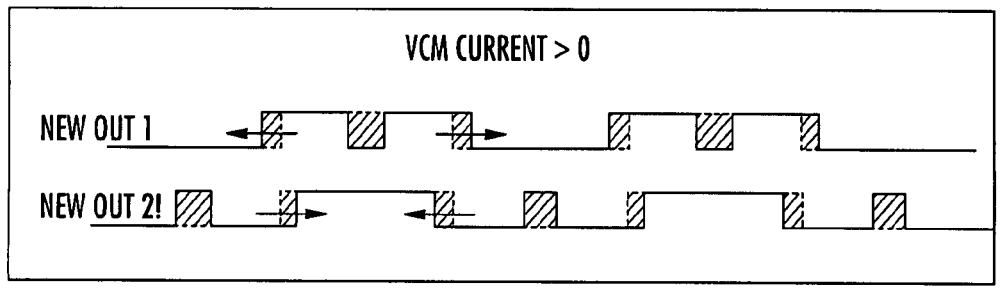
Figure 10:
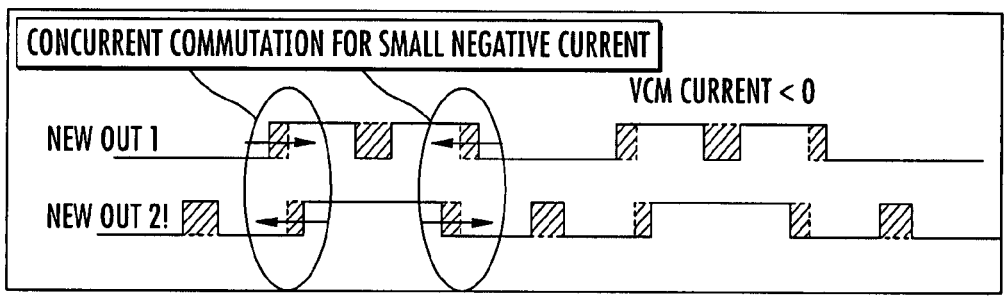

Moreover, in order to program an optimal edge shift introduced under all working conditions, the amount of edge shift to be introduced may be made to depend not only from the programmed level (e.g. DC level) of the current delivered to the load (e.g. to the VCM) but also on whether the sign of the programmed output current inverts. FIGS. 8, 9, and 10 clarify this aspect.

As may be observed in FIG. 8 and in FIG. 9, in case of being delivering a null or a positive output current of relatively small DC level (that is a programmed duty cycle of the two PSM drive signals falling in an established small range centered on the 50% value, for example 50%±5%), the opposite edge shifts that are respectively introduced in one and in the other PSM drive signals may tend to space apart the trailing and leading edge commutations of the two PSM drive signals.

A reverse situation may arise when the output current being delivered becomes of negative sign. As illustrated in FIG. 10, the opposite edge shifts that are introduced in one and in the other PSM drive signal may tend to bring nearer the trailing and leading edge commutations of the two PSM drive signals, and at yet particularly low levels of the delivered output, negative current PSM commutations could become concurrent.

In general, the problem of concurrent edges of the two PSM drive signals may arise only when a duty-cycle in the neighborhood of 50% is used. As already stated, the edge shifts are introduced when the programmed duty-cycle of the two PSM drive signals (that is the programmed DC level of the output current) falls in a certain range in the neighborhood of 50%, for example, 50%±x % (for example: 50%±5%).

Therefore, when a certain DC value is programmed, such to demand a duty-cycle within the range in the neighborhood of 50%, the actual amount of shift to be introduced may be established such that, in the most critical condition of possible programmed level of an output current of negative sign, the switching edges of the two PSM drive signals may remain sufficiently spaced temporarily from one another even in case of a negative output current. This may require an increase in the amount of shift to be introduced from the minimum amount that is sufficient to enhance the time offset of the switching edges when controlling a positive output current, in order to prevent that, when controlling a negative output current, a certain minimum time offset of the switching edges may be preserved.

Alternatively, such a peculiar problem tied to the eventual inversion of the sign of the output current to be forced through the load (VCM) may be resolved by exchanging between themselves the two modified PSM drive signals NEWOUT1 and NEWOUT2! that control the MOSFETs of the output bridge stage (FIG. 5) whenever the sign of the programmed output current to be delivered to the load (VCM) inverts. This may be realized by employing common signal path selectors controlled in function of the sign of the programmed output current. Tests with a PSM driven VCM prototype implementing the this embodiment have demonstrated that the attendant increase of the ripple on the output current does affect control performance because a VCM behaves like an L-R load that has a strong low pass filtering action on the VCM current, with the VCM being sensitive to its mean or effective value, e.g. to the DC level of the programmed output current.

According to another embodiment, prevention of concurrency or quasiconcurrency of PSM commutations may be ensured by introducing a certain phase shift of one of the two PSM drive signals from the other. The amount of phase shift that is introduced, according to this embodiment, between the PSM drive signals NEWOUT1 and NEWOUT2! is predetermined such to ensure that the sum of PSM commutations energies as they get closer may remain safely below a critical level that would generate an unacceptable S/N noise in low signal data upon injection via flexible cable parasitic capacitances into low level signal data lines. On the other hand, the amount of phase shift should not be excessive in order to limit the attendant increase of the ripple on the output current delivered to the motor coil.

Of course, as in the previously described embodiment, when driving a relatively strong output current through the motor coil, the phase shifting circuit may be disabled because the PSM pulse edges become naturally spaced from each other. According to this embodiment, the attendant increase of the ripple on the output current is significantly larger than in the case of the prior embodiment. This aspect may make this embodiment of phase shifting the two PSM drive signals somewhat less preferable.

Figure 11:
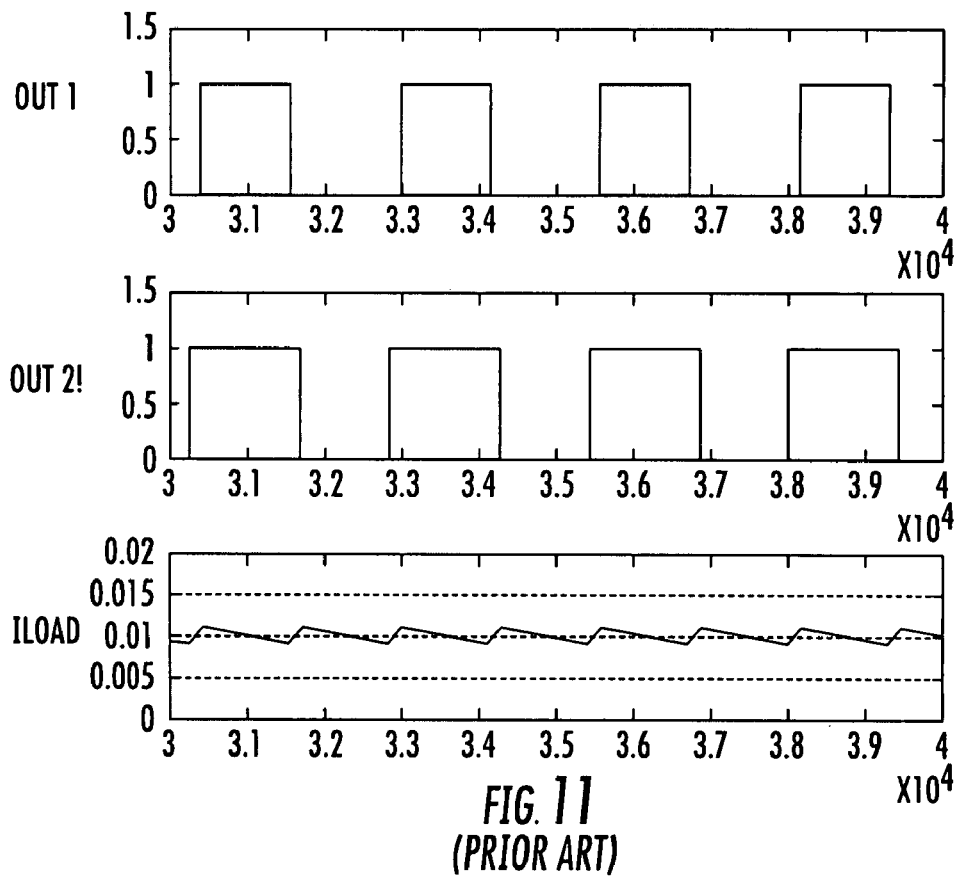
FIGS. 11 and 12 illustrate graphically waveforms according to the prior art and another embodiment of the present invention, respectively, based on the introduction of a phase shift of one of the two PSM drive signals from the other.

FIG. 11 illustrates the waveforms of unshifted PSM drive signals (not modified according to this embodiment) in a condition of control of the head positioning VCM where the edges of the pulses of the two PSM drive signals of the output bridge devices are relatively close to each other (i.e. a relatively small output current, equivalent to 10 mA, is being forced through the motor coil). As may be observed, under these working conditions of the PSM control, the ripple on the output current is relatively small. In these conditions, because of the practical summing of the switching energies of the almost concurrent PSM commutations, switching noise may be injected in low level signal lines.

Figure 12:
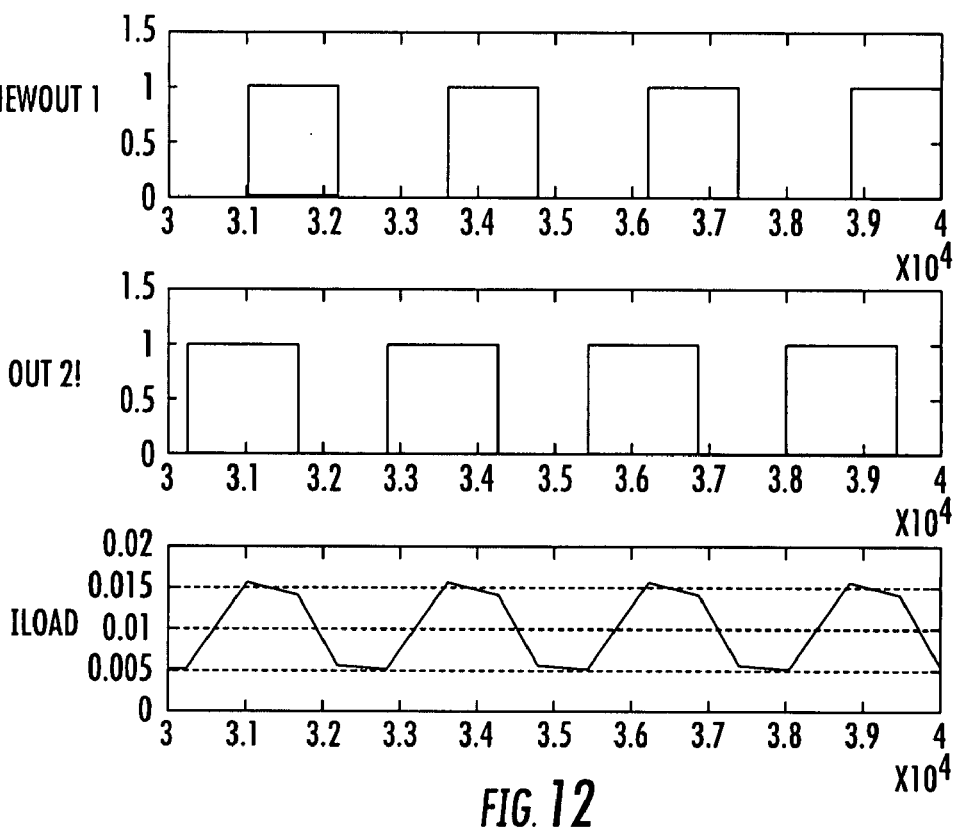

By comparison, FIG. 12 illustrates the waveforms of the two PSM drive signals modified according to this alternative embodiment based on the introduction of a certain phase shift of one drive signal from the other sufficient to prevent concurrent or quasi-concurrent PSM commutations. This effectively may avoid injection of switching noise on low level signal lines and is accompanied by a detectable increase of the ripple on the output current.

Although the ripple amplitude appears to sensibly increase when implementing the phase shifting of the two PSM drive signals, in a measure much more pronounced than with the edge shifting technique of the first embodiment, it has been proven that such a large increase of the ripple amplitude on the output current may not significantly affect the control performance of the VCM, in view of the fact that the motor coil being driven is practically an LR circuit that by acting as a low pass filter on the motor current has a strong filtering action on the current being driven therethrough and makes the motor sensible only to the mean or effective current value (DC level).

The action of phase shifting of one of the two PSM drive signals from the other can be implemented in a quite straightforward manner, for example, by delaying one of the two triangular reference signals (normally in phase opposition) TRIA_0 and TRIA_180, with which the input command ORIGINAL DATA is compared to generate the PSM drive signal pair, by an effective amount, just as needed to securely prevent switching noise injection phenomena. The delay circuit introduced in the path of one of the two triangular reference signals may be by-passed when the programmed output DC current level ORIGINAL DATA surpasses a certain threshold.

Whichever the embodiment, the threshold at which the edge or phase shift is introduced directly may depend on the programmed DC level (ORIGINAL DATA); therefore, normally there may be no need of detecting the output current and the enabling or disabling of the shifting may be automatically determined by the level of the programmed DC current.

That which is claimed:
1. A method of reducing concurrent or quasi-concurrent commutations of a pair of phase shift modulation (PSM) drive signals of an output bridge stage driving a voice coil motor comprising:
    establishing a threshold level of a programmed current level for the voice coil motor; and
    if the programmed current level is lower than the threshold level, enhancing a time offset between commutation edges of the pair of PSM drive signals by a desired time.
2. The method according to claim 1 wherein the enhancing the time offset comprises phase shifting one of the pair of PSM drive signals from the other PSM drive signal.
3. The method according to claim 1 wherein the enhancing the time offset comprises:
    broadening a width of pulses of one of the pair of PSM drive signals; and
    narrowing a width of pulses of the other PSM drive signal while maintaining an individual duty-cycle of each PSM drive signal constant.

4. The method according to claim 3 wherein the maintaining the individual duty-cycle of each PSM drive signal constant comprises:
adding a subtended area to the pulses of the respective PSM drive signal to compensate for the narrowing of the width of the pulses; and
subtracting a subtended area from the pulses of the respective PSM drive signal to compensate for the broadening of the width of the pulses.

5. The method according to claim 4 wherein the programmed current level for the voice coil motor has one of a positive and a negative sign, and the broadening and narrowing of the pulses of one and of the other PSM drive signal, respectively, is of a greater amount than the desired time when delivering an output current of the negative sign.

6. The method according to claim 4 wherein the programmed current level for the voice coil motor has one of a positive and a negative sign; and further comprising, when the sign of the programmed current level for the voice coil motor changes sign, exchanging the pair of PSM drive signals that control transistors forming the output bridge stage.

7. A method of reducing concurrent or quasi-concurrent commutations of a pair of phase shift modulation (PSM) drive signals of an output bridge stage driving a voice coil motor comprising:
establishing a threshold level of a programmed current level for the voice coil motor; and
if the programmed current level is lower than the threshold level, enhancing a time offset between commutation edges of the pair of PSM drive signals by a desired time by at least
broadening a width of pulses of one of the pair of PSM drive signals, and
narrowing a width of pulses of the other PSM drive signal while maintaining an individual duty-cycle of each PSM drive signal constant;
the programmed current level for the voice coil motor has one of a positive and a negative sign, and the broadening and narrowing of the pulses of one and of the other PSM drive signal, respectively, is of a greater amount than the desired time when delivering an output current of the negative sign.

8. The method according to claim 7 wherein the maintaining the individual duty-cycle of each PSM drive signal constant comprises:
adding a subtended area to the pulses of the respective PSM drive signal to compensate for the narrowing of the width of the pulses; and
subtracting a subtended area from the pulses of the respective PSM drive signal to compensate for the broadening of the width of the pulses.

9. The method according to claim 7 further comprising, when the sign of the programmed current level to be transmitted to the voice coil motor changes sign, exchanging the pair of PSM drive signals that control transistors forming the output bridge stage.

10. A circuit for producing a pair of PSM drive signals for an output bridge stage driving a voice coil motor coupled thereto, the circuit comprising:
a digital generator outputting a pair of triangular reference signals having opposite phase, the pair of triangular reference signals being synchronous with a system clock signal applied to an input of said digital generator;
a digital comparator receiving at respective digital inputs the pair of triangular reference signals and a periodic modified digital input signal, said digital comparator outputting the pair of PSM drive signals resulting from a comparison of the periodic modified digital input signal with the pair of triangular reference signals;
an input digital value modulator receiving
at a first input, a programmed input digital value,
at a second input, one of the pair of triangular reference signals output by said digital generator, and
at a third input, a programmed edge shift value for outputting the periodic modified digital input signal modulated by comparing the programmed input digital value, modified by the programmed edge shift value, with the input triangular reference signal,
the periodic modified digital input signal being input to a digital input of said digital comparator in lieu of the programmed input digital value for producing the pair of PSM drive signals.

11. A voice coil motor driving circuit comprising:
an output bridge stage;
a control circuit coupled to said output bridge stage for reducing concurrent or quasi-concurrent commutations of a pair of phase shift modulation (PSM) drive signals of said output bridge stage driving a voice coil motor by at least
establishing a threshold level of a programmed current level for the voice coil motor; and
if the programmed current level is lower than the threshold level, enhancing a time offset between commutation edges of the pair of PSM drive signals by a desired time.

12. The voice coil motor driving circuit according to claim 11 wherein said control circuit further comprises:
a generator outputting a pair of triangular reference signals having opposite phase, the pair of triangular reference signals being synchronous with a system clock signal applied to an input of said generator;
a comparator receiving the pair of triangular reference signals and a periodic modified digital input signal and outputting the pair of PSM drive signals;
an input digital value modulator receiving a programmed input digital value, one of the pair of triangular reference signals, and a programmed edge shift value for outputting the periodic modified digital input signal modulated by comparing the programmed input digital value, modified by the programmed edge shift value, with the input triangular reference signal.

* * * * *